US008495839B2

United States Patent
Tsuzuki et al.

(10) Patent No.: US 8,495,839 B2
(45) Date of Patent: Jul. 30, 2013

(54) INSTALLATION STRUCTURE OF SOLAR CELL MODULE

(75) Inventors: Joji Tsuzuki, Takahama (JP); Shuichi Kobayashi, Takahama (JP); Kenji Yamauchi, Takahama (JP)

(73) Assignee: Yanegijutsukenkyujo Co., Ltd., Takahama (JP)

( * ) Notice: Subject to any disclaimer, the term of this patent is extended or adjusted under 35 U.S.C. 154(b) by 189 days.

(21) Appl. No.: 12/752,408

(22) Filed: Apr. 1, 2010

(65) Prior Publication Data
US 2011/0239546 A1 Oct. 6, 2011

(51) Int. Cl.
*E04D 13/18* (2006.01)
*H01L 31/048* (2006.01)
*H01L 51/05* (2006.01)

(52) U.S. Cl.
USPC ............................ 52/173.3; 136/244; 136/251

(58) Field of Classification Search
USPC .. 52/173.3, 478, 710; 236/244, 251; 126/623, 126/244, 251; 248/200, 205.1, 220.21, 220.22, 248/229.1, 229.15, 229.16, 229.2, 229.25, 248/229.26; 136/244, 251
See application file for complete search history.

(56) References Cited

U.S. PATENT DOCUMENTS

| | | | | |
|---|---|---|---|---|
| 5,367,843 A * | 11/1994 | Hirai et al. | | 52/200 |
| 5,571,338 A * | 11/1996 | Kadonome et al. | | 136/251 |
| 5,706,617 A * | 1/1998 | Hirai et al. | | 52/173.3 |
| 6,105,317 A * | 8/2000 | Tomiuchi et al. | | 52/173.3 |
| 6,370,828 B1 * | 4/2002 | Genschorek | | 52/200 |
| 6,465,724 B1 * | 10/2002 | Garvison et al. | | 136/244 |
| 6,799,398 B1 * | 10/2004 | Plevyak | | 52/173.3 |
| 6,860,076 B2 * | 3/2005 | Heinemann | | 52/536 |
| 6,959,517 B2 * | 11/2005 | Poddany et al. | | 52/173.3 |
| 7,900,407 B2 * | 3/2011 | Plaisted | | 52/173.3 |
| 7,915,519 B2 * | 3/2011 | Kobayashi | | 136/251 |
| 7,956,279 B2 * | 6/2011 | Morita et al. | | 136/251 |

(Continued)

FOREIGN PATENT DOCUMENTS

JP 5-222807 * 8/1993
JP 2000-297509 A 10/2000

(Continued)

OTHER PUBLICATIONS

Japanese Office Action, No. 2008-110962, Jul. 24, 2012.

(Continued)

*Primary Examiner* — Robert Canfield
(74) *Attorney, Agent, or Firm* — Tracy M. Heims; Apex Juris, pllc

(57) ABSTRACT

An installation structure of a solar cell module comprising: a solar cell module including a solar panel, an eaves-side frame in a long shape holding an edge on an eaves side, a ridge-side frame in a long shape holding an edge on a ridge side opposite to the edge on the eaves side, and a lateral frame in a long shape holding edges of the solar panel different from the above edges; and a fixing member fixed to a predetermined structural member in a roof at a position on a ridge side further than the ridge-side frame and configured to prevent the ridge-side frame from moving towards the ridge side of the roof and in a direction perpendicular to a surface of the solar panel, the eaves-side frame of another solar cell module being positioned above the ridge-side frame and supported by the fixing member from outside.

4 Claims, 8 Drawing Sheets

U.S. PATENT DOCUMENTS

| | | | |
|---|---|---|---|
| 7,956,280 B2 * | 6/2011 | Kobayashi | 136/251 |
| 8,039,733 B2 * | 10/2011 | Kobayashi | 136/251 |
| 8,104,239 B2 * | 1/2012 | Fath | 52/173.3 |
| 8,181,402 B2 * | 5/2012 | Tsuzuki et al. | 52/173.3 |
| 8,191,321 B2 * | 6/2012 | McClellan et al. | 52/173.3 |
| 2003/0201009 A1 * | 10/2003 | Nakajima et al. | 136/251 |
| 2004/0011354 A1 * | 1/2004 | Erling | 126/621 |
| 2007/0131273 A1 * | 6/2007 | Kobayashi | 136/251 |
| 2008/0264470 A1 * | 10/2008 | Masuda et al. | 136/251 |
| 2008/0302407 A1 * | 12/2008 | Kobayashi | 136/251 |
| 2008/0315061 A1 * | 12/2008 | Fath | 248/510 |
| 2009/0019795 A1 * | 1/2009 | Szacsvay et al. | 52/173.3 |
| 2009/0114270 A1 * | 5/2009 | Stancel | 136/251 |
| 2010/0126561 A1 * | 5/2010 | Reich | 136/251 |
| 2010/0154784 A1 * | 6/2010 | King et al. | 126/623 |
| 2010/0155547 A1 * | 6/2010 | Kobayashi | 248/121 |
| 2010/0294345 A1 * | 11/2010 | Leithold et al. | 136/251 |
| 2011/0070765 A1 * | 3/2011 | Kobayashi | 439/387 |
| 2011/0154750 A1 * | 6/2011 | Welter et al. | 52/173.3 |
| 2011/0314752 A1 * | 12/2011 | Meier | 52/173.3 |
| 2012/0079781 A1 * | 4/2012 | Koller | 52/173.3 |

FOREIGN PATENT DOCUMENTS

| | | | |
|---|---|---|---|
| JP | 2001-12038 | | 1/2001 |
| JP | 2007-165499 | * | 6/2007 |
| JP | 2008-95281 | * | 4/2008 |
| JP | 2008-303660 | * | 12/2008 |
| JP | 2009-147398 | * | 7/2009 |
| JP | 2009-167793 | * | 7/2009 |
| JP | 2009-263874 | * | 11/2009 |
| JP | 2009-263875 | * | 11/2009 |
| WO | 2010/125699 | * | 11/2010 |
| WO | 2011/077538 | * | 6/2011 |

OTHER PUBLICATIONS

English Translation of Japanese Office Action, No. 2008-110962, Jul. 24, 2012.

* cited by examiner

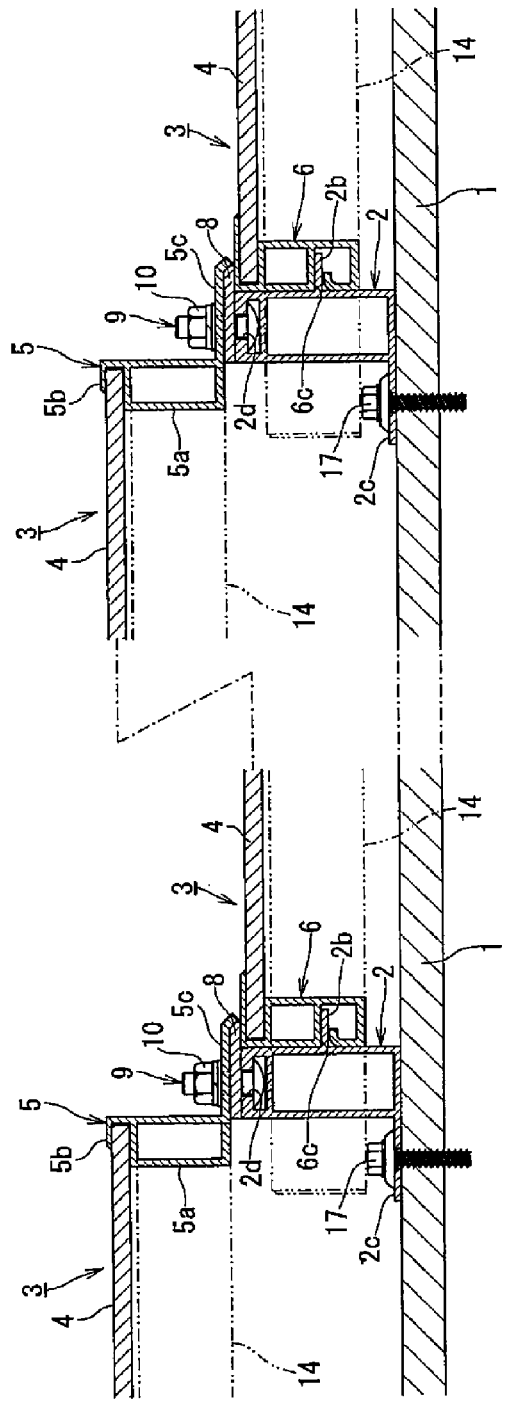
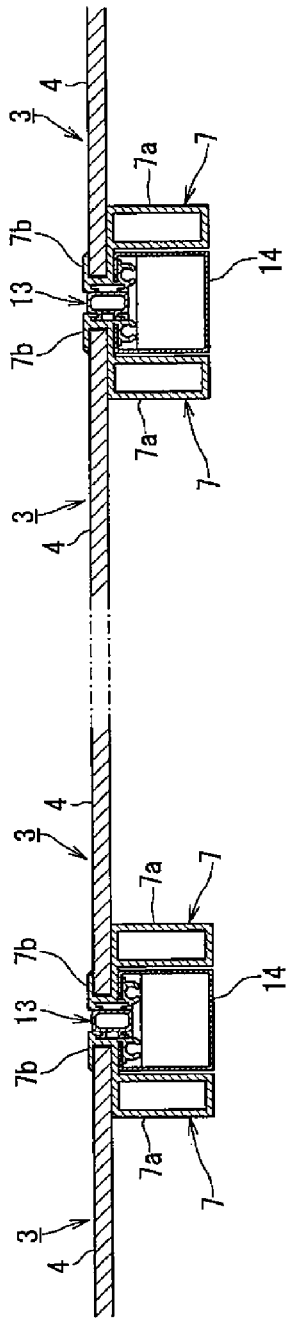
FIG. 1A
FIG. 1B

INSTALLATION STRUCTURE OF SOLAR CELL MODULE

BACKGROUND OF THE INVENTION

1. Field of the Invention

The present invention relates to an installation structure of a solar cell module to install the solar cell module on a roof or the like.

2. Description of the Related Art

Photovoltaic power generation by installing a plurality of solar cell modules obtained by enclosing an outer circumference of plate-shaped solar panels with frames has been known.

As an installation structure of a solar cell module, for example, a fastening part to fasten to a sheathing roof board and a fitting recess are formed in a ridge-side frame to hold a ridge side of a solar panel, a fitting convex to fit into the fitting recess of the ridge-side frame is formed in an eaves-side frame to hold an eaves side of the solar panel and, while the fastening part of the ridge-side frame in solar cell modules placed facing each other on the eaves side is fixed to the sheathing roof board, solar cell modules on the eaves and ridge sides are each fixed to the sheathing roof board by fitting the fitting convex in the eaves-side frame of the solar cell module to be arranged on the ridge side into the fitting recess in the ridge-side frame (Japanese Patent Application Laid-Open No. 2000-297509).

However, a plurality of solar cell modules to be installed on a roof is successively fixed to the sheathing roof board from the eaves side of the roof toward the ridge side according to a conventional installation structure of solar cell modules and thus, while installation work of solar cell modules is simplified, when solar cell modules are removed due to damage or maintenance of the installed solar cell modules, it is impossible to remove only target solar cell modules and thus, it becomes necessary to remove solar cell modules on the ridge side, posing problems of time and effort expended for maintenance or the like and an increase in cost.

Thus, in view of the above circumstances, an object of the present invention is to provide an installation structure of a solar cell module that enables easy installation of the solar cell module and also easy removal of the solar cell module.

SUMMARY OF THE INVENTION

An installation structure of a solar cell module according to the present invention, comprises: a solar cell module including a solar panel whose outline is rectangular and flat in shape, an eaves-side frame in a long shape holding an edge on an eaves side of the solar panel, a ridge-side frame in a long shape holding an edge on a ridge side of the solar panel, the edge on the ridge side being opposite to the edge on the eaves side across the solar panel, and a lateral frame in a long shape holding edges of the solar panel, the edges being different from the edges held by the eaves-side frame and the ridge-side frame; and a fixing member fixed to a predetermined structural member included in a roof at a position on a ridge side further than the ridge-side frame of the solar cell module, the fixing member configured to prevent the ridge-side frame from moving towards the ridge side of the roof and in a direction perpendicular to a surface of the solar panel, the eaves-side frame of another solar cell module being positioned above the ridge-side frame prevented by the fixing member from moving, and being supported by the fixing member from outside.

Here, the predetermined "structural member" constituting the roof includes a "rafter", "sheathing roof board", "horizontal muntin bridged over the rafter", and "binding rafter".

According to the present invention, when a structural member of a roof is caused to support a solar cell module held by enclosing an outer circumference of a solar panel by an eaves-side frame, a ridge-side frame and lateral frames by a fixing member, the ridge-side frame of the solar cell module arranged on the eaves side is prevented from moving to the ridge side and in a direction perpendicular to the surface of the solar panel, and the eaves-side frame of the solar cell module arranged on the ridge side is supported above the ridge-side frame from outside and therefore, even after the solar cell module is installed, the support of the ridge-side frame by the fixing member can easily be lifted from outside. Then, by moving the solar cell module having the eaves-side frame whose support has been lifted to the eaves side, the support of the ridge-side frame by the fixing member can be lifted, so that the solar cell module can be removed. Therefore, even after a plurality of the solar cell modules is installed on a roof or the like, the solar cell modules can easily be removed, so that maintainability of the solar cell module can be increased and also an increase in cost can be prevented.

Moreover, the ridge-side frame of the solar cell module is prevented from moving to the ridge side and in a direction perpendicular to the surface of the solar panel by the fixing member and is also fixed to the structural member at a position on the ridge side from the eaves-side frame and therefore, a plurality of solar cell modules can be fixed one by one to the structural member from the eaves side toward the ridge side, so that the solar cell modules can be installed easily. The fixing member may be made slidable relative to the eaves-side frame or the ridge-side frame in the longitudinal direction thereof, thereby allowing the fixing member to be fixed easily at a position of the structural member such as a rafter where strength or rigidity is high, so that fixing strength of the solar cell module can be increased and also reliability of installation can be improved. Moreover, the length of the fixing member can be made shorter than the eaves-side frame, so that the cost for the fixing member can be reduced.

Further, the fixing member supports the solar cell modules so that the eaves-side frame in the solar cell module on the ridge side is positioned above the ridge-side frame in the solar cell module on the eaves side, and a plurality of solar cell modules can be installed stepwise and therefore, if roofing tiles are also installed together, the solar cell modules can be installed in such a way that the solar cell modules are in line with roofing tiles to be installed together, which can prevent the aesthetic beauty of the roof where the solar cell modules are installed from being damaged and also improve architectural designs on the roof.

Moreover, the structural member is caused to support the solar cell module by the fixing member and therefore, when compared with a case when the solar cell module is supported via a base or the like, the number of components needed for an installation structure is reduced, so that an increase in cost can be suppressed.

Incidentally, the fixing member may be caused to directly support the eaves-side frame in the solar cell module on the ridge side or indirectly via a predetermined link member or via the link member and the ridge-side frame.

In addition to the above configuration, the installation structure of a solar cell module according to the present invention may be configured such that: the lateral frame of the solar cell module includes: a locking groove in a predetermined cross-sectional shape, the locking groove being open to an outside flank and extending in a longitudinal direction; and a suspension groove formed on a solar panel side further than the locking groove and on a side below the solar panel, the suspension groove extending in a longitudinal direction, and being open to either one of a side of an outside flank or a side opposite thereto, and wherein the installation structure of a solar cell module further comprises: an elastic member in a long shape including a locking part configured to be locked by the locking groove of the lateral frame, and an elastic part having the locking part on one flank; and a gutter member in a box shape whose eaves side and upper side are open and are than the lateral frame locked by the elastic member, the gutter member including a suspension piece configured to be inserted into the suspension groove of at least one of the lateral frames adjacent to an upper part of the gutter member, and wherein in a state where the locking part of the elastic member is locked by the locking groove of the lateral frame, and where the lateral frame of another solar cell module abuts a flank of the elastic member opposite to the locking part such that an elastic force acts on the elastic member, the gutter member is supported by the lateral frames with the suspension pieces of the gutter member inserted into the respective suspension grooves of the lateral frames opposite to each other between the elastic member.

According to the present invention, the outside flank of one lateral frame of the opposite lateral frames of the solar cell module adjacent in a direction perpendicular to the direction directed from the ridge side to the eaves side is caused to lock an elastic member, and the elastic member is sandwiched between the one lateral frame and the other lateral frame so that the elastic member is compressed and then, a suspension piece of a gutter member is inserted into a suspension groove of each lateral frame to support the gutter member and therefore, installation errors of the adjacent solar cell modules can be absorbed by the elastic member and also deterioration of appearance due to a gap between the lateral frames can be prevented. Moreover, infiltration of rain water or the like from between the lateral frames can be prevented by the elastic member. Further, even if rain water or the like infiltrates from between the lateral frames, the rain water can be received by the gutter member, so that rain water or the like can be prevented from infiltrating to the side of the structural member.

Moreover, one of the adjacent lateral frames is caused to lock the fixing member, the other lateral frame is brought into contact, the adjacent lateral frames are not mutually linked, and the lateral frames can easily be separated and therefore, the solar cell modules can easily be installed and removed, so that costs can be reduced by shortening time and effort needed for installation work and maintenance.

Further, one lateral frame is caused to lock the elastic member and therefore, the elastic member will not fall even if the elastic member is not pressed against when the solar cell modules are installed or removed so that workability of installation and removal of the solar cell modules can be enhanced.

Moreover, the elastic member is sandwiched between the adjacent lateral frames, the gutter member is arranged thereunder, and infiltration of rain water or the like from between the lateral frames can be prevented as much as possible and therefore, water resistance on the side of the structural member can be simplified, so that overall costs regarding the roof including the structural member can be reduced.

The gutter member is made longer than the lateral frame and therefore, the gutter member arranged on the ridge side and the gutter member arranged on the eaves side can mutually be overlapped when the gutter members are mounted on the lateral frame by mounting the gutter member so that the ridge side of the gutter member projects to the ridge side from the ridge-side frame. Accordingly, rain water or the like infiltrated to the gutter member can reliably be delivered to the gutter member on the eaves side and infiltration thereof to the side of the structural member can be prevented by reliably discharging the infiltrated rain water or the like.

Further, the elastic member and the gutter member are made lockable and insertable with respect to the lateral frame respectively and therefore, the elastic member and the gutter member can easily be removed from the lateral frame and if, for example, the solar cell modules are unitized by installing a plurality of solar cell modules on a structural member such as a sheathing roof board and rafter in a plant in advance by the fixing members, members projecting outward from the lateral frames at both ends of the unit can be eliminated, making transportation of the unit and mounting thereof on a roof easier.

Incidentally, it is desirable to set the number of suspension pieces of member to one so that the suspension piece can be inserted into one suspension groove of the suspension grooves of the adjacent lateral frames and accordingly, even if an error of positional intervals between the lateral frames occurs, the gutter member can be reliably suspended between the lateral frames and also installation workability of the gutter member can be improved. Alternatively, the number of suspension pieces of the gutter member may be set to two so that the suspension piece can be inserted into the suspension groove of each of the adjacent lateral frames, thereby causing the lateral frames to support both ends of the gutter member.

An installation structure of a solar cell module comprises: a solar cell module including a solar panel whose outline is rectangular and flat in shape, an eaves-side frame in a long shape holding an edge on an eaves side of the solar panel, a ridge-side frame in a long shape holding an edge on a ridge side of the solar panel, the edge on the ridge side being opposite to the edge on the eaves side across the solar panel, and a lateral frame in a long shape including a locking groove in a predetermined cross-sectional shape and a suspension groove formed on a solar panel side further than the locking groove and on a side below the solar panel, the locking groove being open to an outside flank and extending in a longitudinal direction, the suspension groove extending in a longitudinal direction and being open to either one of a side of an outside flank or a side opposite thereto; a fixing member fixed to a predetermined structural member included in a roof at a position on a ridge side further than the ridge-side frame of the solar cell module, the fixing member configured to support the ridge-side frame of the solar cell module and the eaves-side frame of another solar cell module; an elastic member in a long shape including a locking part configured to be locked by the locking groove of the lateral frame of the solar cell module supported by the fixing member, and an elastic part having the locking part on one flank; and a gutter member in a box shape whose eaves side and upper side are open and are than the lateral frame locked by the elastic member, the gutter member including a suspension piece configured to be inserted into the suspension groove of at least one of the lateral frames adjacent to an upper part of the gutter member, in a state where the locking part of the elastic member is locked by the locking groove of the lateral frame, and where the lateral frame of another solar cell module abuts a flank of the elastic member opposite to the locking part such that an elastic force acts on the elastic member, the gutter member being supported by the lateral frames with the suspension pieces of the gutter member inserted into the respective suspension grooves of the lateral frames opposite to each other between the elastic member.

According to the present invention, rain water or the like can be prevented from infiltrating from between the lateral frames in the adjacent solar cell modules by the elastic member, even if rain water or the like infiltrates from between the lateral frames, the rain water or the like can be received by the gutter member arranged under the elastic member, and the same operation effect as described above can be achieved.

In addition to the above configuration, the installation structure of a solar cell module according to the present invention is configured such that: the ridge-side frame of the solar cell module includes an opening extending in a longitudinal direction on an outside flank, and wherein the fixing member includes: a body part in a rectangular cross-sectional shape having an abutment surface abutting a flank of the ridge-side frame; an insertion piece projecting from a predetermined position of the abutment surface of the body part in a direction substantially perpendicular to the abutment surface, the insertion pieces configured to be inserted into the opening of the ridge-side frame; and a fixing piece extending from a bottom surface of the body part in a direction opposite to a direction in which the insertion piece extends, the fixing piece configured to be fixed to a predetermined structural member.

According to the present invention, an opening is provided on the outside flank of the ridge-side frame in the solar cell module and also a body part capable of coming into contact with the outside flank of the ridge-side frame, an insertion piece insertable into the opening of the ridge-side frame, and a fixing piece extending from a bottom surface of the body part to the eaves side are provided in the fixing member and therefore, by bringing the ridge-side frame into contact with the body part and inserting the insertion piece into the opening, the eaves-side frame can be prevented from moving to the eaves side and in a direction perpendicular to the surface of the solar panel and also the fixing member that can be fixed to the structural member on the eaves side from the eaves-side frame can be embodied, so that the above operation effect can be reliably achieved.

The opening of the eaves-side frame through which the insertion piece of the fixing member is inserted is provided by extending in the longitudinal direction of the eaves-side frame and while the insertion piece of the fixing member is inserted through the opening, the fixing member can be slid along the eaves-side frame and therefore, the fixing member can be easily fixed at a position of the structural member where strength or rigidity of the rafter or the like is high by sliding the fixing member, so that fixing strength of the solar cell module can be increased and also reliability of installation can be improved.

A chamfering part may be provided at a tip below the opening in the eaves-side frame and accordingly, insertion of the insertion piece of the fixing member through the opening can be made easier and when a solar cell module is reinstalled after the installed solar cell module is removed, it can be made easier to put an upper tip of the opening in the eaves-side frame onto the insertion piece of the fixing member fixed to the structural member, so that installation work of the solar cell module can be made easier.

In addition to the above configuration, the installation structure of a solar cell module according to the present invention is configured such that: the eaves-side frame of the solar cell module includes a supporting piece extending outward from a bottom edge of an outside flank in substantially the same direction as a direction in which the solar panel extends, the supporting piece having a plurality of through holes passing therethrough at predetermined positions in a longitudinal direction, and wherein the fixing member includes a T groove in an inverted T cross-sectional shape arranged on a ridge side further than the ridge-side frame, the T groove extending in a longitudinal direction, and being open on an upper side, and wherein the installation structure of a solar cell module further comprises: a fastener including a bolt having a male screw in a cylindrical shape configured to pass through an open portion of the T groove, and a head formed at one end of the male screw configured to slide inside the T groove and configured not to rotate; and a nut configured to be screwed to the male screw of the bolt, and wherein in a state where the head of the bolt is inserted into the T groove so that the male screw of the bolt in the fastener projects outward from the open portion of the T groove and the male screw projecting upward from the fixing member is caused to pass through the through-hole of the supporting piece in the eaves-side frame, the eaves-side frame is supported by the fixing member by the nut screwed to the male screw.

According to the present invention, a supporting piece projecting outward from the outside flank is provided in the eaves-side frame of the solar cell module and also a T groove is provided in the upper part of the fixing member, and after the head of a bolt is inserted into the T groove of the fixing member, the male screw of the bolt projecting upward from the fixing member is passed through a through-hole of the supporting piece in the eaves-side frame, the fixing member is caused to support the eaves-side frame by screwing the nut to the male screw of the bolt and therefore, the fixing member can be caused to reliably support the eaves-side frame from outside, so that the above operation effect can be reliably achieved.

Moreover, the T groove of the fixing member into which the head of the bolt is inserted is formed to extend in the longitudinal direction of the fixing member and therefore, the position where the male screw of the bolt projects from the fixing member freely be moved (slid) and even if the position of the through-hole of the supporting piece in the eaves-side frame is shifted, the supporting piece can be reliably supported by sliding the bolt.

Further, the male screw of the bolt projecting upward from the T groove of the fixing member is passed through the through-hole of the supporting piece in the eaves-side frame and therefore, the solar cell module on the ridge side can be prevented from moving to the eaves side by the bolt and even if the nut is loosened or come off, the solar cell module on the ridge side can be prevented from immediately moving to the eaves side to fall from the roof or the like.

In addition to the above configuration, the installation structure of a solar cell module according to the present invention is configured such that: the solar cell module includes a fastening part on an outside flank of the eaves-side frame and a second opening extending in a longitudinal direction on an outside flank of the eaves-side frame, and wherein the installation structure of a solar cell module further comprises a link member in a long shape along the eaves-side frame including a base edge configured to be inserted into the second opening, and a tip part projecting above the ridge-side frame when the link member is inserted into the second opening of the ridge-side frame and having a through-hole formed at a position corresponding to the fastening part of the eaves-side frame, and wherein in a state where the base edge of the link member is inserted into the second opening of the ridge-side frame and an outside flank of the eaves-side frame abuts the tip part, the eaves-side frame is supported by a predetermined fastener fastened to the fastening part of the eaves-side frame through the through-hole of the tip part.

Here, the "fastening part" includes a "part having a groove holding a nut not rotatably and slidably in the longitudinal direction of the eaves-side frame", "part having a female screw hole", and "part not rotatably having a nut embedded".

According to the present invention, a fastening part is provided on the outside flank of the eaves-side frame in the solar cell module and also a second opening is provided on the outside flank of the ridge-side frame and further, a link member including a base edge insertable into the second opening and a tip part projecting above the ridge-side frame and having a through-hole formed therein and while the base edge of the link member is inserted into the second opening of the ridge-side frame, the fixing member is caused to support the eaves-side frame via the ridge-side frame and the link member by bringing the tip part into contact with the outside flank of the eaves-side frame and fastening a fastener such as a bolt to the fastening part through the through-hole and therefore, the fixing member can be caused to reliably support the eaves-side frame from outside so that the above operation effect can be reliably achieved.

The eaves-side frame is supported by bringing the outside flank of the eaves-side frame into contact with the tip part of the link member and therefore, the solar cell module on the ridge side can be prevented from moving to the eaves side by the link member and even if the fastener is loosened or comes off, the solar cell module on the ridge side can be prevented from immediately moving to the eaves side to fall from the roof or the like.

In addition to the above configuration, the installation structure of a solar cell module according to the present invention further includes a water-resistant waterproof member in a long shape including an elastic member, the waterproof member arranged between the ridge-side frame of the solar cell module on the eaves side and the eaves-side frame of the solar cell module on the ridge side, both supported by the fixing member.

According to the present invention, a waterproof member is arranged between the eaves-side frame in the solar cell module on the ridge side and the ridge-side frame of the solar cell module on the eaves side and therefore, infiltration of rain water or the like to the side of the structural member from between the eaves-side frame and the ridge-side frame can be prevented. Because infiltration of rain water or the like to the side of the structural member can be prevented, water resistance on the side of the structural member can be simplified, so that overall costs regarding the roof including the structural member can be reduced.

According to the present invention, as described above, an installation structure of a solar cell module that enables easy installation of the solar cell module and also easy removal of the solar cell module can be provided.

BRIEF DESCRIPTION OF THE DRAWINGS

FIG. 1A is a sectional view showing an installation structure of a solar cell module in the present invention by cutting the installation structure in a direction linking a ridge side and an eaves side of a roof;

FIG. 1B is a sectional view showing the installation structure of a solar cell module by cutting the installation structure in FIG. 1A in a direction perpendicular to the direction linking the ridge side and the eaves side of the roof;

FIG. 12 is a sectional view showing an example of still another lateral frame and another elastic member;

DETAILED DESCRIPTION OF THE PREFERRED EMBODIMENTS

Figure 2:
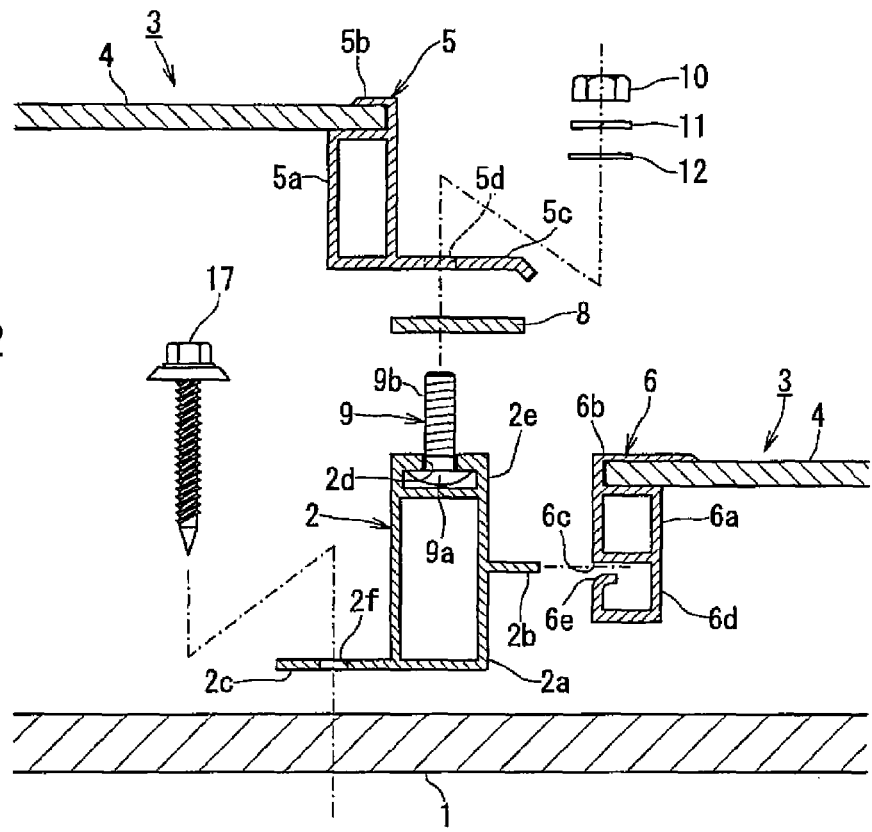
FIG. 2 is an exploded sectional view showing the installation structure shown in FIG. 1A by breaking down the installation structure into each member.
Figure 3:
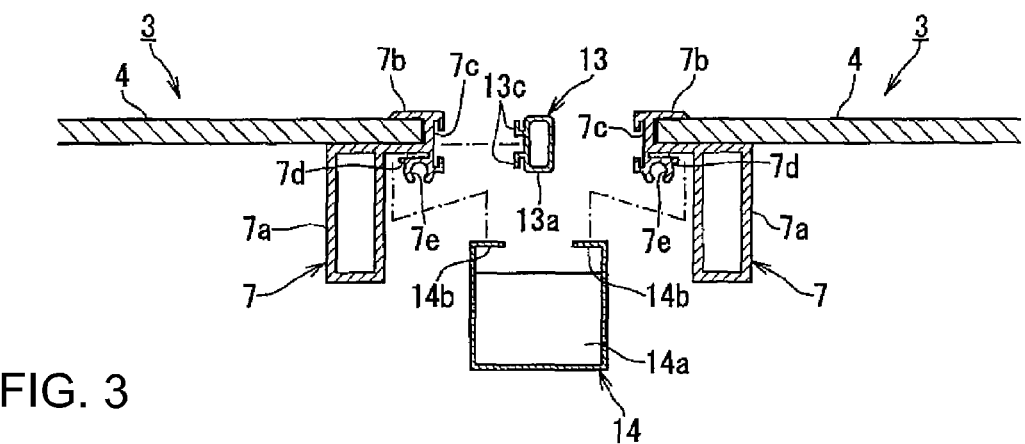
FIG. 3 is an exploded sectional view showing the installation structure shown in FIG. 1B by breaking down the installation structure into each member.
Figure 4:
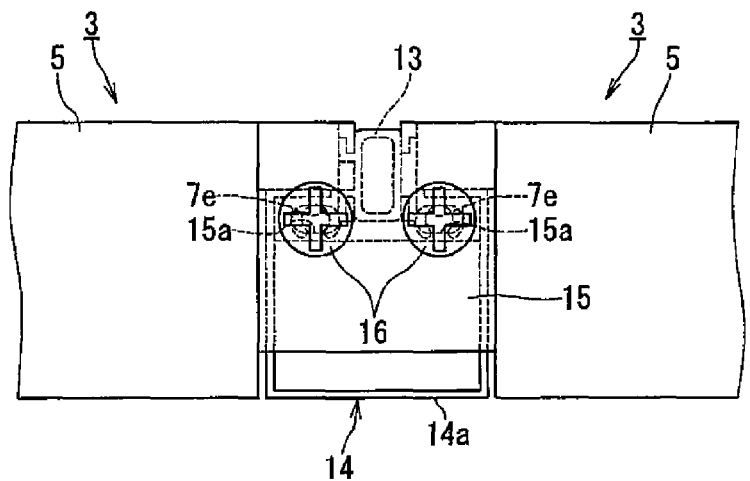
FIG. 4 is a ridge-side side view showing a joint part of a solar cell module adjacent to the installation structure of a solar cell module shown in FIG. 1 in a horizontal direction from the ridge side of the roof.

An installation structure of a solar cell module that is a preferred embodiment of the present invention will be described below in detail with reference to FIGS. 1 to 4. FIG. 1A is a sectional view showing an installation structure of a solar cell module in the present invention by cutting the installation structure in a direction linking the ridge side and the eaves side of a roof and FIG. 1B is a sectional view showing the installation structure of a solar cell module by cutting the installation structure in FIG. 1A in a direction perpendicular to the direction linking the ridge side and the eaves side of the roof. FIG. 2 is an exploded sectional view showing the installation structure shown in FIG. 1A by breaking down the installation structure into each member. FIG. 3 is an exploded sectional view showing the installation structure shown in FIG. 1B by breaking down the installation structure into each member. FIG. 4 is a ridge-side side view showing a joint part of a solar cell module adjacent to the installation structure of a solar cell module shown in FIG. 1 in a horizontal direction from the ridge side of the roof.

As shown in FIGS. 1 to 4, the installation structure of a solar cell module in the present embodiment includes a fixing member 2 fixed relative to structural member 1 (for example, a sheathing roof board, rafter, horizontal muntin bridged over the rafter, and binding rafter) constituting a roof and a plurality of solar cell modules 3 successively supported by the fixing member 2 from the eaves side of the roof toward the ridge side and supported individually removably.

A solar cell module 3 used in an installation structure of a solar cell module in the present example includes a solar panel 4 whose external shape is rectangular and flat, a long-shaped eaves-side frame 5 to hold an eaves-side edge of the solar panel 4, a long-shaped ridge-side frame 6 to hold an edge on the opposite side of the eaves-side frame 5, and a long-shaped lateral frame 7 to hold edges that are different from edges held by the eaves-side frame 5 and the ridge-side frame 6. The eaves-side frame 5, the ridge-side frame 6, and the lateral frame 7 in the solar cell module 3 are extrusions extending in a long shape and made of aluminum or the like without an illustrated sectional shape being changed.

The eaves-side frame 5 in the solar cell module 3 includes, as illustrated, a body part 5a in a rectangular shape extending vertically in a cross section thereof, a holding part 5b extending upward from the upper surface of the body part 5a along a surface forming an outside flank of the solar cell module 3 and capable of holding an edge of the solar panel 4 in a direction along a surface thereof by fitting, and a supporting piece 5c extending substantially in the same direction as a direction in which the solar panel 4 held by the holding part 5b outward from the outside flank of the body part 5a. The eaves-side frame 5 also has a plurality (for example, two to four) of through-holes 5d cutting through the supporting piece 5c formed at predetermined positions (specific positions are not illustrated) of the eaves-side frame 5 in the longitudinal direction.

The ridge-side frame 6 in the solar cell module 3 includes, as illustrated, a body part 6a in a rectangular shape in a cross section thereof, a holding part 6b extending upward from the upper surface of the body part 6a along a surface forming the outside flank of the solar cell module 3 and capable of holding an edge of the solar panel 4 in a direction along a surface thereof by fitting, and a leg 6d extending downward from the bottom surface of the holding part 6b along a surface on the opposite side of the outside flank and forming an opening 6c of a predetermined width (height) from the bottom surface of the body part 6a on the outside flank of the body part 6a.

Further, the lateral frame 7 in the solar cell module 3 includes, as illustrated, a body part 7a in a rectangular shape extending vertically in a cross section thereof, a holding part 7b extending outward from a surface forming the outside flank of the solar cell module 3 along the upper surface of the body part 7a, arranged above the body part 7a, and capable of holding an edge of the solar panel 4 in a direction along a surface thereof by fitting, a locking groove 7c opened in the outside flank of the holding part 7b and having a T-shaped section, and a suspension groove 7d arranged below the holding part 7b between the locking groove 7c and the body part 7a, extending substantially in a direction along the upper surface of the body part 7a, and whose side opposite to the outside flank of the holding part 7b is released. The lateral frame 7 also includes a screwing part 7e whose section has a C shape below the suspension groove 7d.

In the present example, heights of the eaves-side frame 5, the ridge-side frame 6, and the lateral frame 7 are each assumed to be substantially the same. Though not illustrated, a sealant to prevent infiltration of rain water or the like is provided between the solar panel 4 and each of the holding parts 5b, 6b, and 7b. Incidentally, oxide film treatment or coating treatment may be provided to the surface of the eaves-side frame 5, the ridge-side frame 6, and the lateral frame 7.

The solar cell module 3 can increase strength or rigidity thereof by the eaves-side frame 5, the ridge-side frame 6, and the lateral frame 7 holding the outer circumference of the solar panel 4 being assembled in a frame shape, so that the solar cell panel 4 can be protected.

Reference numeral 8 in FIGS. 1A and 2 denotes a waterproof member made of elastic member such as flexible resin, foaming resin, and elastomer and having water resistance and is arranged between the supporting piece 5c in the eaves-side frame 5, and the holding part 6b in the ridge-side frame 6 and the upper surface of the fixing member 2, so that infiltration of rain water or the like into the structural member 1 from between the eaves-side frame 5 and the ridge-side frame 6 can be prevented.

The fixing member 2 used in an installation structure of a solar cell module in the present example includes, as illustrated, a body part 2a in a rectangular shape extending vertically in a cross section thereof, an insertion piece 2b projecting substantially in a right angle direction from one flank (flank on the eaves side) of the body part 2a, a fixing piece 2c extending from the bottom surface of the body part 2a in a direction opposite to the direction in which the insertion piece 2b extends, and a T groove 2d arranged to extend upward from the upper surface of the body part 2a and whose upper side is released and whose section has an inverted T shape. The flank on the side on which the insertion piece 2b in the body part 2a of the fixing member 2 projects is an abutment surface 2e capable of coming into contact with the outside flank of the ridge-side frame 6.

The fixing member 2 also has a plurality (for example, two or three) of through-holes 2f cutting through the fixing piece 2c formed at predetermined positions of the fixing piece 2c. The fixing member 2c in the present example can be fixed, as illustrated, to the structural member 1 by screwing securing bolts 17 into the structural member 1 through the through-holes 2f of the fixing piece 2c. Though a detailed illustration is omitted, a flat washer of the securing bolt 17 is filled with a calking compound and even if rain water or the like infiltrates into a lower part of the solar cell module 3, the rain water is prevented from infiltrating to the rear side of the structural member 1 through the securing bolt 17.

In the fixing member 2, the insertion piece 2b projecting from the body part 2a is made insertable into the opening 6c of the ridge-side frame 6. The fixing member 2 has the insertion piece 2b at a position so that, after the insertion piece 2b is caused to be inserted into the opening 6c of the ridge-side frame 6 to bring the bottom surface of the body part 6a on the ridge-side frame 6 into contact with the upper surface of the insertion piece 2b, the upper surface of the fixing member 2 is substantially as high as the upper surface of the ridge-side frame 6.

Like the eaves-side frame 5, the ridge-side frame 6, and the lateral frame 7 of the solar cell module 3, the fixing member 2 is an extrusion made of aluminum or the like and has a form extending in a long shape without an illustrated sectional shape being changed. Though not illustrated, the fixing member 2 is set to have a length (50 mm to 200 mm) shorter than the length (800 mm to 2500 mm) of the eaves-side frame 5 and the ridge-side frame 6 to partially support the eaves-side frame 5 and the ridge-side frame 6.

The T groove 2d of the fixing member 2 is set, as illustrated, to have a size that allows a head 9a to be inserted into the T groove 2d by sliding so that a male screw 9b projects upward from a released portion of the upper surface of the T groove 2d while the head 9a of a bolt 9 being directed downward. The T groove 2d is also set to have a width that makes rotation of the head 9a of the inserted bolt 9 impossible. In the present example, a square neck bolt is shown as the bolt 9 and the width of the upper groove in the T groove 2d is the width that makes rotation of a corner of a square neck bolt impossible. Incidentally, the width of the lower groove in the T groove 2d is the width that makes rotation of the head of a hexagon head bolt impossible so that, instead of a square neck bolt, a hexagon head bolt can also be used.

In FIGS. 1A and 2, reference numeral 10 denotes a nut that can be screwed to the male screw 9b of the bolt 9 and reference numeral 11 denotes an elastic washer such as a spring washer that can be inserted into the male screw 9b of the bolt 9, and reference numeral 12 denotes a washer such as a flat washer that can be inserted into the male screw 9b of the bolt 9.

An installation structure of a solar cell module in the present embodiment further includes, as shown in FIGS. 1B and 3, an elastic member 13 in a long shape that can be locked to the locking groove 7c of the lateral frame 7 and has water resistance and a gutter member 14 in a box shape that can support the lateral frame 7 via the suspension groove 7d of the lateral frame 7.

The elastic member 13 includes an elastic part 13a whose external shape is substantially rectangular, is hollow, has a pair of locking parts 13b formed on one flank, and is lockable to the locking groove 7c of the lateral frame 7. The elastic member 13 in the present example is molded by extruding elastomer, and the elastic part 13a made hollow is made elastically deformable. Moreover, the elastic member 13 is made substantially as long as edges on the eaves side and the ridge side in the solar cell module 3.

As shown in FIG. 1B, the elastic part in the present example makes the lateral frames 7 opposite to each other in the two solar cell modules 3 watertight by causing the locking groove 7c of one of the opposite lateral frames 7 to lock the locking part 13b and also elastically bringing the flank of the elastic part 13a in the elastic member 13 on the opposite side of the side on which the locking part 13b is formed into contact with the outside flank of the other lateral frame 7 (outside flank of the holding part 7b).

On the other hand, as shown in FIG. 3, the gutter member 14 includes a body part 14a in a box shape whose eaves side and upper side are released and a pair of suspension pieces 14b arranged in an upper part of sidewalls on both sides in the body part 14a and insertable into the suspension groove 7d of the lateral frame 7. As shown in FIG. 1B, the gutter member 14 is supported in a state like being suspended below the holding part 7b of the lateral frame 7 by inserting each of the pair of suspension pieces 14b into the suspension groove 7d of the opposite lateral frame 7 in the two solar cell modules 3.

If the gutter member 14 in the present example is in a state like being suspended below the lateral frames 7, the lower part of the locking groove 7c of the lateral frame 7 and the screwing part 7e are positioned inside the body part 14a, so that rain water or the like infiltrated through the outside flank of the lateral frame 7 can be received by the body part 14a.

Incidentally, the gutter member 14 is set to have a length longer than that of a lateral edge in the solar cell module 3 so that, when installed on a roof, as shown in FIG. 1A, the gutter member 14 projects to the ridge side from a ridge side end of the solar cell module 3 and extends up to the lower side of the solar cell module 3 supported by the ridge side. The gutter member 14 in the present example is formed by curvature-forming a plate material such as stainless steel.

Further, as shown in FIG. 4, an installation structure of a solar panel module in the present example further includes a cap member 15 in a plate shape that links ridge-side ends of the solar cell modules 3 adjacent in a direction perpendicular to the direction linking the ridge side and the eaves side of a roof and also closes a gap between the ridge-side ends of the opposite lateral frames 7. The cap member 15 can be fixed to each of the lateral frames 7 by screwing a vis 16 (pan head vis) into the screwing part 7e of the lateral frame 7 through a long hole 15a from outside while a top edge thereof is substantially matched to that of the lateral frame 7 or the eaves-side frame 5.

The cap member 15 in the present example is set to be slightly lower than the lateral frame 7 or the like and, when the cap member 15 is fixed to a lateral frame, as shown in FIG. 4, the gutter member 14 is exposed from a lower part of the cap member 15, so that rain water or the like led by the gutter member 14 can be discharged to the outside.

Next, a construction method for an installation structure of a solar cell module in the present embodiment will be described. First, the fixing member 2 is fixed at predetermined intervals substantially parallel to the horizontal direction of a roof at positions closest to the eaves side where the solar cell modules 3 are installed to the structural member 1 of the roof. At this point, the fixing member 2 is fixed to the structural member 1 using the securing bolt 17 with the side on which the fixing piece 2c of the fixing member 2 projects is directed to the ridge side. Though a specific illustration is omitted, because the fixing member 2 is shorter than the eaves-side frame 5, the ridge-side frame 6 or the like of the solar cell module 3, the fixing member 2 is fixed to the structural member 1 at intervals that allow to support one solar cell module 3 with an appropriate number (for example one to three) of the fixing members 2.

Then, after the fixing members 2 are fixed to the structural member 1, next the head 9a of the bolt 9 is inserted, as illustrated, into the T groove 2d of the fixing member 2 so that the male screw 9b projects upward. The number of the bolts 9 to be inserted into the T groove 2d of the fixing member 2 is a number corresponding to the number of the fixing members 2 supporting one ridge-side frame 6 and the number of the through-holes 5d formed in the supporting piece 5c of the eaves-side frame 5 in the solar cell module 3.

Subsequently, the supporting piece 5c of the eaves-side frame 5 in the solar cell module 3 to be arranged on the ridge side is placed above the fixing member 2. When the eaves-side frame 5 is placed, the bolt 9 is slid to an appropriate position in the T groove 2d so that the male screw 9b of the projecting bolt 9 from the upper surface of the fixing member 2 passes through the through-hole 5d formed in the supporting piece 5c. When the eaves-side frame 5 is placed above the fixing member 2, a waterproof member 8 of an appropriate length may be arranged between the fixing member 2 and the eaves-side frame 5.

Then, the washer 12 and the elastic washer 11 are inserted in this order into the male screw 9b of the bolt 9 extending by passing through the through-hole 5d of the supporting piece 5c in the eaves-side frame 5, the nut 10 is screwed to the male screw 9b thereon, and the nut 10 is tightened with appropriate torque before a state is created in which the eaves-side frame 5 in the solar cell module 3 is supported by the fixing member 2 from outside.

In this state, the solar cell module 3 is blocked from moving to the eaves side and the ridge side by the bolt 9 passing through the through-hole 5d of the supporting piece 5c in the eaves-side frame 5 and also blocked from moving in the horizontal direction of the roof and a direction perpendicular to the panel surface of the solar panel 4 by fastening the nut 10 screwed to the male screw 9b of the bolt 9.

Then, after the fixing member 2 is caused to support the eaves-side frame 5 of the solar cell module 3, next the ridge-side frame 6 of the solar cell module 3 is fixed to the structural member 1 by the fixing member 2. More specifically, the insertion piece 2b of the fixing member 2 is inserted into the opening 6c of the ridge-side frame 6 to bring the abutment surface 2e of the fixing member 2 into contact with the outside flank of the ridge-side frame 6. Then, in this state, the body part 2a of the fixing member 2 and the bottom of the fixing piece 2c are brought into contact with the upper surface of the structural member 1, and the securing bolt 17 is screwed into the structural member 1 from above through the through-hole 2f of the fixing piece 2c to fix the fixing member 2 to the structural member 1.

Then, with each of the fixing members 2 being fixed to the structural member 1, the solar cell module 3 is blocked from moving to the eaves side by the fixing member 2 on the eaves side and also blocked from moving to the ridge side by the fixing member 2 on the ridge side. At the same time, the solar cell module 3 is blocked from moving in a direction perpendicular to the surface of the solar panel 4 by the insertion piece 2b of the fixing member 2 and also blocked from moving in a lateral direction of the roof by a frictional force caused by contact of the abutment surface 2e of the fixing member 2 and the outside flank of the ridge-side frame 6. Accordingly, the solar cell module 3 is installed and fixed to the structural member 1 via the fixing member 2.

The opening 6c of the ridge-side frame 6 extends in a longitudinal direction thereof and the fixing member 2 can be slid along the ridge-side frame 6 while the insertion piece 2b of the fixing member 2 is inserted into the opening 6c of the ridge-side frame 6 and thus, the fixing member 2 may be fixed after being slid to an appropriate position (the position where fixing strength is the strongest, for example, the position of the rafter) with respect to the structural member 1. Moreover, when the fixing member 2 is fixed to the structural member 1, a seat for waterproofing may be inserted between the fixing member 2 and the structural member 1.

When another solar cell module 3 is fixed to the ridge side of the solar cell module 3 fixed to the structural member 1 via the fixing member 2, like the fixing member 2 on the eaves side, the head 9a of the bolt 9 is inserted into the T groove 2d of the fixing member 2 on the ridge side. Then, after the head 9a of the bolt 9 is inserted into the T groove 2d of the fixing member 2, the waterproof member 8 is placed on the upper surface of the fixing member 2 and the upper surface of the ridge-side frame 6 in the installed solar cell module 3. Subsequently, the supporting piece 5c of the eaves-side frame 5 in the solar cell module 3 to be arranged on the ridge side is placed above the waterproof member 8.

Then, after the horizontal position of the solar cell module 3 on the ridge side is matched to the position of the solar cell module 3 on the eaves side, the washer 12 and the elastic washer 11 are inserted in this order into the male screw 9b of the bolt 9 extending by passing through the through-hole 5d of the supporting piece 5c, the nut 10 is screwed to the male screw 9b thereon, and the nut 10 is tightened with appropriate torque before a state is created in which the eaves-side frame 5 in the solar cell module 3 on the ridge side is supported by the fixing member 2 from outside. Then, by repeating the same work as described above, the solar cell module 3 is successively installed on the structural member 1 from the eaves side toward the ridge side.

Incidentally, when a plurality of the solar cell modules 3 is also installed in the lateral direction of the roof, after the first solar cell module 3 is fixed to the structural member 1, the locking groove 7c of the lateral frame 7 arranged adjacent thereto in the horizontal direction is caused to lock the locking part 13b of the elastic member 13 to cause the lateral frame 7 to support the elastic member 13. Then, the solar cell module 3 to be arranged adjacent thereto is moved to the solar cell module 3 fixed to the structural member 1 to sandwich the elastic part 13a of the elastic member 13 by the mutual lateral frames 7 to generate an elastic force. At this point, the pitch of the screwing part 7e in each of the lateral frames 7 is made to substantially match the pitch of a mounting hole in the cap member 15.

Next, after each of the lateral frames 7 of the adjacent solar cell module 3 is set to a predetermined position, the gutter member 14 is inserted between the opposite lateral frames 7 from the eaves side of the solar cell module 3 to have the gutter member 14 supported. More specifically, the suspension piece 14b of the gutter member 14 is inserted into the respective suspension groove 7d of the opposite lateral frame 7, and the gutter member 14 is slid in the direction of the ridge side until the eaves-side front end thereof substantially matches the eaves-side front end of the lateral frame 7.

Then, after having the gutter member 14 supported between a pair of the lateral frames 7, the cap member 15 is brought into contact with the eaves-side front ends of the pair of the lateral frames 7, and the predetermined vis 16 after passing through the cap member 15 is tightened to the screwing part 7e of the lateral frame 7 to mount the cap member 15. Accordingly, a flush state where the front face of the cap member 15 substantially matches the outside flank of the eaves-side frame 5 in the solar cell module 3 is created, so that the solar cell module 3 can also be installed in the lateral direction in a watertight state.

Incidentally, once when the solar cell module 3 installed on the structural member 1 is removed, the nut 10 fixing the eaves-side frame 5 of the solar cell module 3 to be removed to the fixing member 2 is first removed from the male screw 9b. Then, if the eaves-side frame 5 is raised until the male screw 9b of the bolt 9 comes out of the through-hole 5d of the supporting piece 5c and the solar cell module 3 is moved to the eaves side, the insertion piece 2b of the fixing member 2 comes out from the opening 6c of the ridge-side frame 6, so that the solar cell module 3 can be removed.

On the other hand, when the solar cell module 3 is reinstalled at a position from which the solar cell module 3 has been removed, the solar cell module 3 is moved from the eaves side to the ridge side so that the insertion piece 2b in the fixing member 2 on the ridge side is inserted into the opening 6c in the ridge-side frame 6 of the solar cell module 3 to be reinstalled. At this point, work is done while the solar cell module 3 is tilted to the insertion piece 2b, but in the present example, as shown in FIG. 2, an R-shaped chamfering part 6e is formed at a corner below the opening 6c and thus, it is easy to put an entry into the opening 6c on the tip of the insertion piece 2b, facilitating the insertion/support work of the insertion piece 2b.

Then, after the insertion piece 2b is inserted into the opening 6c in the ridge-side frame 6 to cause the fixing member 2 on the eaves side to support the ridge-side frame 6, the solar cell module 3 can be installed by placing the eaves-side frame 5 on the fixing member 2 on the eaves side and screwing the nut 10 to the male screw 9b of the bolt 9 after passing through the through-hole 5d of the supporting piece 5c.

In the present example, the elastic member 13 is locked/supported only in one of the adjacent lateral frames 7 in the horizontal direction of the solar cell module 3 and the other lateral frame 7 is only in contact and thus, in contrast to the direction linking the ridge side and the eaves side, the solar cell modules 3 are not mutually linked and do not offer any obstacle to removal of the solar cell module 3. Moreover, the elastic member 13 is elastically in contact with the other lateral frame 7 and thus, a gap can be formed between the elastic member 13 and the lateral frame 7 by elastically deforming the elastic member 13 and the solar cell modules 3 can be gripped by inserting a finger or the like into the gap, making removal work of the solar cell module 3 easy.

When the solar cell module 3 is installed on the structural member 1 at a construction site, the solar cell module 3 may be directly installed to the structural member 1 of a roof at the site. Alternatively, the solar cell module 3 may be preinstalled on the predetermined structural member 1 in a plant or the like that is different from the construction site to form a unit (roof unit) before the unit is installed on the roof of a building or the like at the construction site. When a unit is pre-formed in a plant or the like, it is desirable to form a unit in a state where the elastic member 13 and the gutter member 14 are removed from the lateral frames 7 positioned at both ends in the horizontal direction, making transportation of the unit and installation work on the roof easier to perform.

According to an installation structure of a solar cell module in the present embodiment, as described above, the supporting piece 5c projecting outward from the outside flank is provided in the eaves-side frame 5 of the solar cell module 3 and also the T groove 2d is provided above the fixing member 2 and, after the male screw 9b of the bolt 9 projecting upward from the fixing member 2 by the head 9a of the bolt 9 being inserted into the T groove 2d of the fixing member 2 is passed through the through-hole 5d of the supporting piece 5c in the eaves-side frame 5, the fixing member 2 is caused to support the eaves-side frame 5 from above by screwing the nut 10 to the male screw 9b of the bolt 9. That is, the fixing member 2 is caused to support the eaves-side frame 5 from outside and thus, even after the solar cell module 3 is installed, the support of the eaves-side frame 5 by the fixing member 2 from outside can easily be lifted. Then, by moving the solar cell module 3 having the eaves-side frame 5 whose support has been lifted to the eaves side, the support of the ridge-side frame 6 by the fixing member 2 can be lifted, so that the solar cell module 3 can be removed. Therefore, even after a plurality of the solar cell modules 3 is installed on a roof or the like, the solar cell modules 3 can easily be removed, so that maintainability of the solar cell module 3 can be increased and also an increase in cost can be prevented.

Moreover, the ridge-side frame 6 of the solar cell module 3 is prevented from moving to the ridge side and in a direction perpendicular to the surface of the solar panel 4 by the fixing member 2 and also fixed to the structural member 1 at a position on the ridge side from the eaves-side frame 5 and therefore, a plurality of the solar cell modules 3 can be fixed one by one to the structural member 1 from the eaves side toward the ridge side, facilitating installation of the solar cell modules 3. Moreover, the plurality of the solar cell modules 3 is installed stepwise and thus, if roofing tiles are also installed together, the solar cell modules 3 can be installed in such a way that the solar cell modules 3 are in line with roofing tiles to be installed together, thereby preventing the aesthetic beauty of the roof where the solar cell modules 3 are installed from being damaged and also improving architectural designs on the roof.

Further, the male screw 9b of the bolt 9 projecting upward from the T groove 2d of the fixing member 2 is passed through the through-hole 5d of the supporting piece 5c in the eaves-side frame 5 and thus, the solar cell module 3 on the ridge side can be prevented from moving to the eaves side by the bolt 9 and even if the nut 10 is loosened or comes off, the solar cell module 3 on the ridge side can be prevented from immediately moving to the eaves side to fall from the roof or the like.

Because the waterproof member 8 is arranged between the eaves-side frame 5 in the solar cell module 3 on the ridge side and the ridge-side frame 6 in the solar cell module 3 on the eaves side, rain water or the like can be prevented from infiltrating to the side of the structural member 1 from between the eaves-side frame 5 and the ridge-side frame 6. Moreover, because infiltration of rain water or the like to the side of the structural member 1 can be prevented, water resistance on the side of the structural member 1 can be simplified, so that overall costs regarding the roof including the structural member 1 can be reduced.

In the foregoing, the present invention has been described with reference to a preferred embodiment, but the present invention is not limited to the preferred embodiment and, as will be shown below, various modifications and design changes can be made without deviating from the scope of the present invention.

That is, in the present embodiment, when the solar cell module 3 is installed on the structural member 1, the eaves-side frame at the end of the eaves side is supported by the fixing member 2, but for example, the supporting piece 5c of the eaves-side frame 5 may be fixed directly to the structural member 1 without the aid of the fixing member 2. Alternatively, the fixing member 2 arranged at the end of the eaves side may be replaced by a stator member in a long shape capable of supporting the eaves-side frame 5 in the same manner as the fixing member 2 to support the eaves-side frame 5, achieving the same operation effect as described above.

Figure 5:
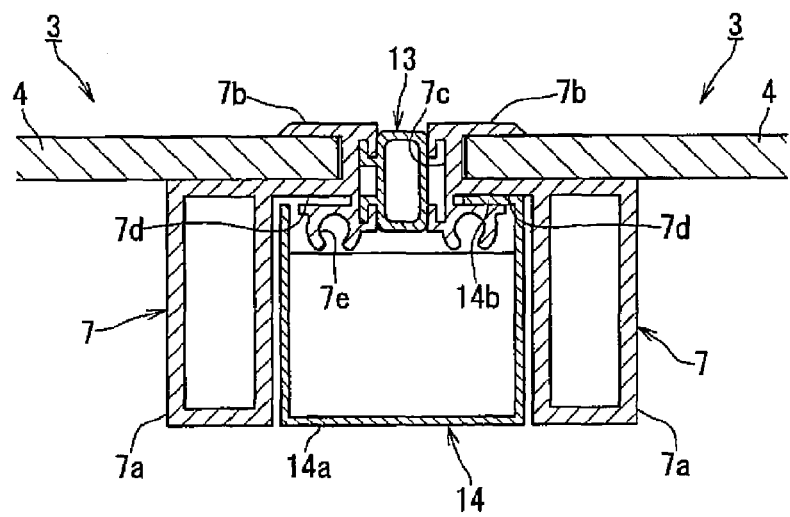
FIG. 5 is a sectional view showing a modification of a gutter member in an embodiment of FIG. 1.

Also in the present embodiment, the gutter member 14 provided with a pair of the suspension pieces 14b is shown, but as shown in FIG. 5, the gutter member 14 may be provided with only one suspension piece 14b. Accordingly, even if an error of positional intervals between the lateral frames 7 occurs, the gutter member 14 can be reliably suspended between the lateral frames 7 and also installation workability of the gutter member 14 can be improved.

Figure 6:
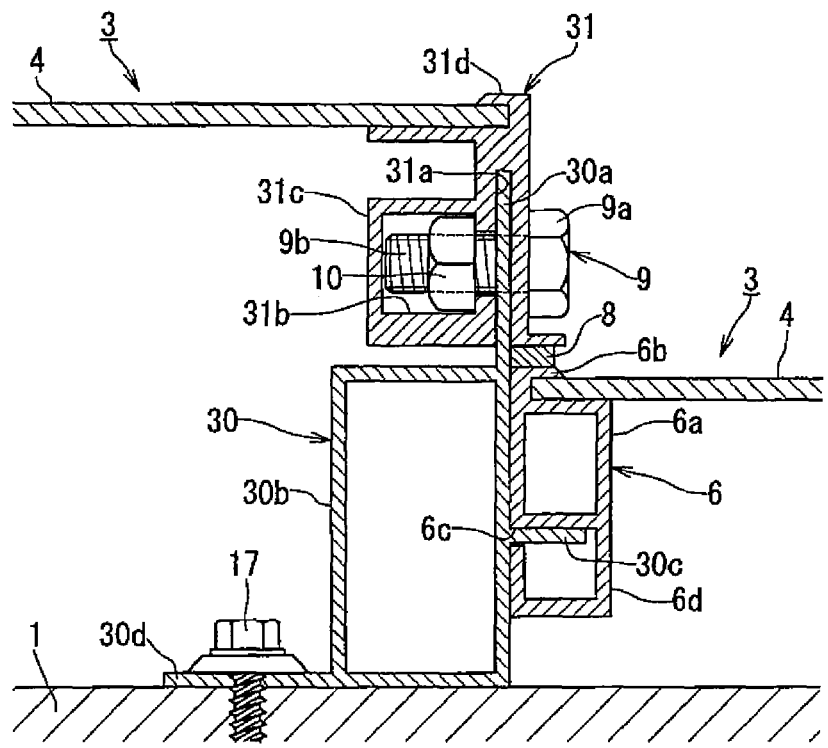
FIG. 6 is a sectional view showing the installation structure of a solar cell module in an embodiment different from FIG. 1 by cutting the installation structure in a direction linking a ridge side and an eaves side of a roof.
Figure 7:
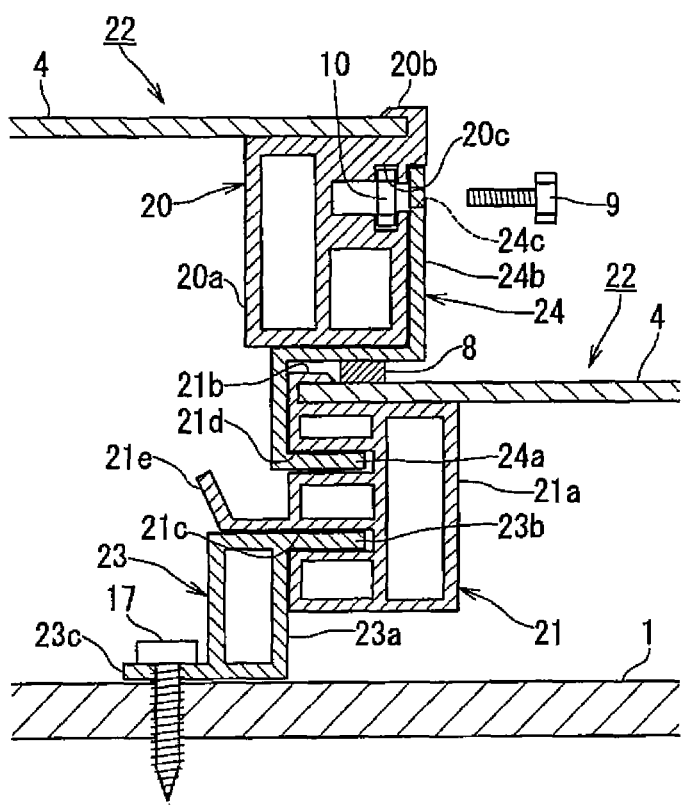
FIG. 7 is a sectional view showing the installation structure of a solar cell module in still another embodiment by cutting the installation structure in the direction linking the ridge side and the eaves side of the roof.

Further in the present embodiment, the head 9a of the bolt 9 is inserted into the T groove 2d of the fixing member 2 to cause the fixing member 2 to support the eaves-side frame 5, but for example, as shown in FIG. 6, a fixing member 30 may be provided with a rising piece 30a extending upward and an eaves-side frame 31 with a support groove 31a capable of supporting the rising piece 30a of the fixing member 30 through insertion and a nut holding part 31b capable of holding the nut 10 so that the eaves-side frame 31 can be removably supported by the fixing member 30 by inserting the rising piece 30a into the support groove 31a and then fastening the bolt 9 to the nut 10 held by the nut holding part 31b by passing through the rising piece 30a from outside.

The fixing member 30 in the above example further includes a body part 30b whose external sectional shape is rectangular, an insertion piece 30c extending outward from one flank of the body part 30b, and a fixing piece 30d extending outward along the bottom surface of the body part 30b on the opposite side of the insertion piece 30c to fix to the structural member 1, and the rising piece 30a extends upward along the flank on the side on which the insertion piece 30c in the body part 30b extends. The eaves-side frame 31 in the above example further includes a body part 31c whose external sectional shape is substantially rectangular and having a nut holding part 31b formed therein and a holding part 31d arranged above the body part 31c and capable of holding an edge of the solar panel 4 by fitting and a support groove 31a into which the rising piece 30a can be inserted from below is formed between the outside flank of the eaves-side frame 31 and the nut holding part 31b. The same reference numerals are attached to similar component members as those in the first embodiment and a detailed description thereof is omitted. This example can also achieve the same operation effect as the above embodiment.

Also in the present embodiment, the fixing member 2 is caused to directly support the eaves-side frame 5 in the solar cell module 3, but as shown in FIGS. 7 to 10, the fixing member 2 may be caused to indirectly support the eaves-side frame 5. For example, the installation structure of a solar cell module in an embodiment in FIG. 7 includes a solar cell module 22 in which the solar panel 4 is enclosed by an eaves-side frame 20, a ridge-side frame 21 and lateral frames (not shown), a fixing member 23 supporting the ridge-side frame 21 of the solar cell module 22 and fixed to the structural member 1, and a link member 24 linking the ridge-side frame 21 and the eaves-side frame 20 and also capable of separating the eaves-side frame 20 from outside. The same reference numerals are attached to similar component members as those in the first embodiment and a detailed description thereof is omitted.

The eaves-side frame 20 of the solar cell module 22 includes a body part 20a whose sectional outer circumference is rectangular, a holding part 20b arranged above the body part 20a and capable of holding an edge of the solar panel 4 by fitting, and a fastening groove 20c open to the outside flank of the body part 20a to hold the predetermined nut 10 without rotating and sliding in the longitudinal direction. The ridge-side frame 21 of the solar cell module 22 includes a body part 21a whose sectional outer circumference is rectangular, a holding part 21b arranged above the body part 21a and capable of holding an edge of the solar panel 4 by fitting, a first opening 21c extending in the longitudinal direction on the outside flank of the body part 21a, and a second opening 21d extending above the first opening 21c in the longitudinal direction on the outside flank of the body part 21a. The ridge-side frame 21 also includes a water reservoir part 21e extending outward from above the first opening 21c and whose tip is curved upward, so that rain water or the like that is infiltrated through the eaves-side frame 20, the link member 24 or the like can be prevented from infiltrating to the side of the structural member 1.

The fixing member 23 includes a body part 23a whose sectional outer circumference is rectangular, a insertion piece 23b projecting from the upper surface of the body part 23a in a predetermined direction, and a fixing piece 23c projecting from the bottom surface of the body part 23a in a direction opposite to the direction in which the insertion piece 23b projects. Further, the link member 24 includes a base edge 24a enabled to be inserted into the second opening 21d of the ridge-side frame 21 and a tip part 24b that turns above the ridge-side frame 21 and then rises upward after the base edge 24a is inserted into the second opening 21d. A through-hole 24c is formed at a predetermined position of the tip part 24b.

In this installation structure of a solar cell module, the ridge-side frame 21 can be fixed to the structural member 1 by inserting the insertion piece 23b of the fixing member 23 into the first opening 21c of the ridge-side frame 21. By inserting the base edge 24a of the link member 24 into the second opening 21d of the ridge-side frame 21, a state where the tip part 24b of the link member 24 rises upward above the ridge-side frame 21 can be created. If the outside flank of the eaves-side frame 20 is brought into contact with the ridge-side face of the tip part 24b in the link member 24 and the bolt 9 is screwed to the nut 10 inserted into the fastening groove 20c of the eaves-side frame 20 through the through-hole 24c of the tip part 24b in this state, the eaves-side frame 20 and the ridge-side frame 21 can be linked by the link member 24.

Therefore, the eaves-side frame 20 will be supported by the fixing member 23 via the link member 24 and the ridge-side frame 21. Also in this embodiment, the eaves-side frame 20 can be raised upward by removing the bolt 9 to unfasten the link member 24 and the eaves-side frame 20 so that, like the above embodiments, the solar cell module 22 can easily be removed and the same operation effect as described above can be achieved.

Figure 8:
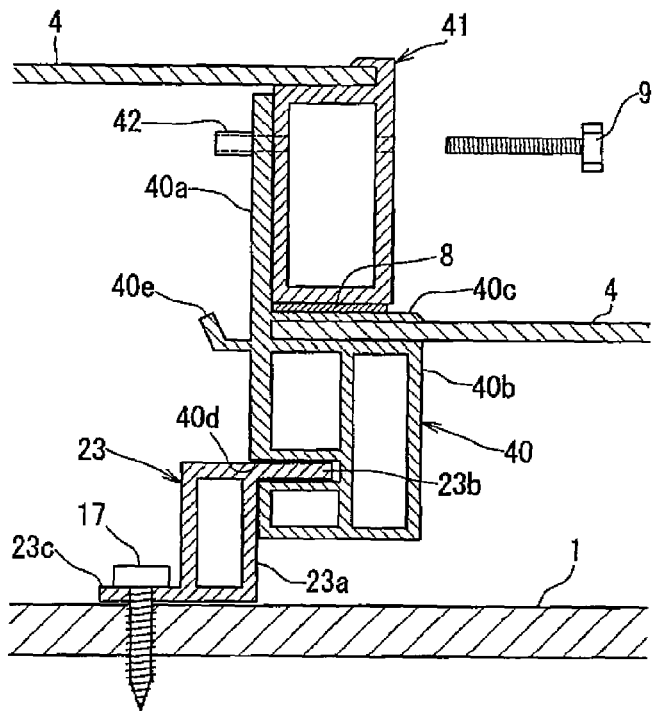
FIG. 8 is a sectional view showing still another embodiment of the installation structure of a solar cell module by cutting the installation structure in the direction linking the ridge side and the eaves side of the roof.
Figure 9:
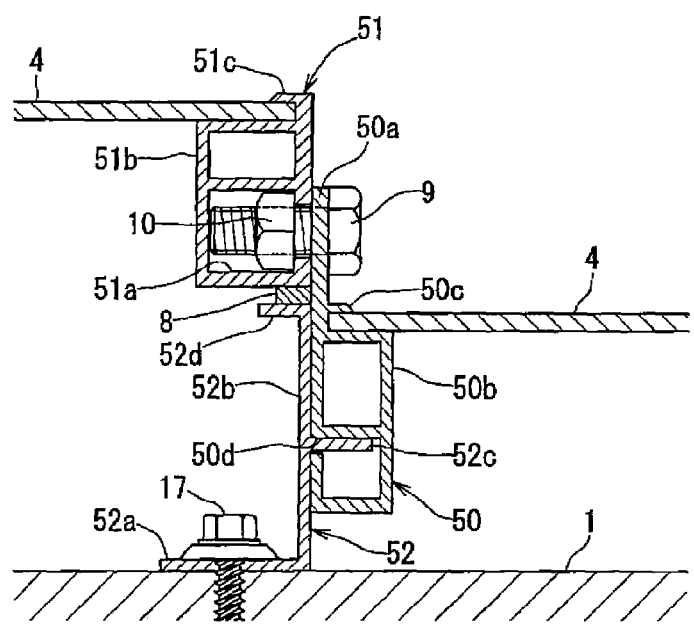
FIG. 9 is a sectional view showing still another embodiment of the installation structure of a solar cell module by cutting the installation structure in the direction linking the ridge side and the eaves side of the roof.
Figure 10:
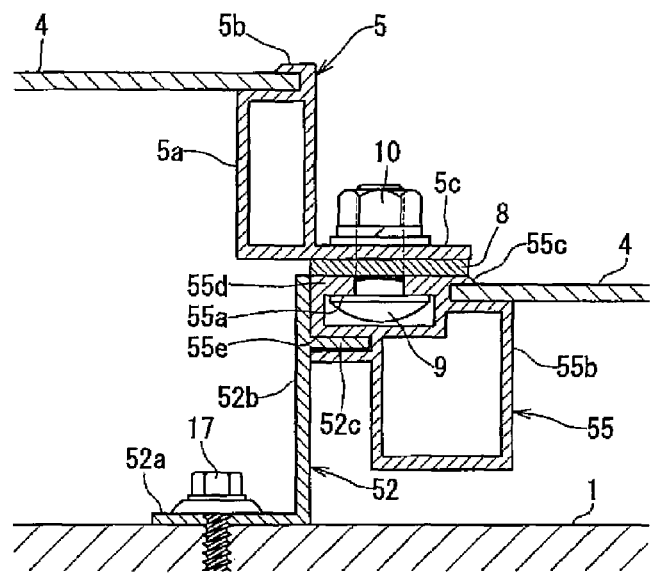
FIG. 10 is a sectional view showing still another embodiment of the installation structure of a solar cell module by cutting the installation structure in the direction linking the ridge side and the eaves side of the roof.

As another example to cause the fixing member to indirectly support the eaves-side frame, as shown in FIGS. 8 to 10, the fixing member may be caused to indirectly support the eaves-side frame by causing the ridge-side frame supported by the fixing member to support the eaves-side frame. In the example shown in FIG. 8, a ridge-side frame 40 is caused to removably support an eaves-side frame 41 by forming a rising piece 40a extending upward along the outside flank thereof in the ridge-side frame 40, bringing an inside flank of an eaves-side frame 41 into contact with a ridge-side face of the rising piece 40a, and fastening the bolt 9 to the rising piece 40a by passing through the eaves-side frame 41 from outside.

Like the above ridge-side frames, the ridge-side frame 40 includes a body part 40b in a rectangular shape, a holding part 40c arranged above the body part 40b and capable of holding a ridge-side edge of the solar panel 4 by fitting, and an opening 40d open to the outside flank of the body part 40b. The rising piece 40a of the ridge-side frame 40 rises above the holding part 40c along the outside flank of the body part 40b. The ridge-side frame 40 also has a female screw member 42 screwable to the bolt 9 integrally fixed firmly on the outside flank at a position of the rising piece 40a where bolt 9 is fastened. The ridge-side frame 40 also includes a water reservoir part 40e extending outward from the outside flank including the rising part and whose tip is curved upward.

The eaves-side frame 41 in this example includes a body part 41a whose section is rectangular and a holding part 41b arranged above the body part 41a and capable of holding an eaves-side edge of the solar panel 4 by fitting. The fixing member 23 in this example has the same configuration as the example in FIG. 7 and the same reference numerals are attached and a description thereof is omitted. In this example, the waterproof member 8 arranged between the ridge-side frame 40 and the eaves-side frame 41 is adhered to the upper surface of the holding part 40c in the ridge-side frame 40 and the upper surface of the waterproof member 8 is set to be a gliding surface with small frictional resistance.

In the example shown in FIG. 9, on the other hand, a ridge-side frame 50 includes a rising piece 50a extending upward along the outside flank thereof and an eaves-side frame 51 includes a nut holding part 51a holding the nut 10 without rotating, and the ridge-side frame 50 is caused to support the eaves-side frame 51 from outside by fastening the bolt 9 to the nut 10 held by the nut holding part 51a by passing through the rising piece 50a from the inside flank of the rising piece 50a after the outside flank of the eaves-side frame 51 is brought into contact with the outside flank of the rising piece 50a of the ridge-side frame 50.

Like the above ridge-side frames, the ridge-side frame 50 also includes a body part 50b in a rectangular shape, a holding part 50c arranged above the body part 50b and capable of holding a ridge-side edge of the solar panel 4 by fitting, and an opening 50d open to the outside flank of the body part 50b, and the rising piece 50a extends upward along the outside flank of the body part 50b above the holding part 50c. Though an illustration is omitted, the rising piece 50a has a plurality of through-holes through which the bolt 9 can pass formed at predetermined positions of the rising piece 50*a*. The eaves-side frame 51 includes a body part 51*b* whose external shape is rectangular and having a nut holding part 51*b* formed therein and a holding part 51*c* arranged above the body part 51*b* and holding an eaves-side edge of the solar panel 4 by fitting.

Further, a fixing member 52 in this example includes, as illustrated, a fixing piece 52*a* in contact with the fixing member 2, a standing wall part 52*b* rising upward from an eaves-side edge of the fixing piece 52*a*, an insertion piece 52*c* extending halfway through the standing wall part 52*b* in the opposite direction of the fixing piece 52*a* and insertable into the opening 50*d* of the ridge-side frame 50, and a mounting part 52*d* extending from the top edge of the standing wall part 52*b* in the same direction as the fixing piece 52*a*. In this example, the eaves-side frame 51 is placed on the mounting part 52*d* of the fixing member 52 by sandwiching the waterproof member 8 therebetween to regulate downward movement of the eaves-side frame 51 by the mounting part 52*d*.

In the example shown in FIG. 10, a T groove 55*a* to hold the head 9*a* of the bolt 9 is formed not rotatably but slidably in a ridge-side frame 55 and the ridge-side frame 55 is caused to support the eaves-side frame 5 via the bolt 9 inserted into the T groove 55*a*. In this example, the eaves-side frame 5 has the same configuration as the eaves-side frame 5 in the embodiment shown in FIG. 1, the fixing member 52 has a configuration obtained by omitting the mounting part 52*d* from the configuration of the fixing member 52 of the example shown in FIG. 9, and the same reference numerals are attached to similar components and a detailed description thereof is omitted.

The ridge-side frame 55 in this example includes, as illustrated, a body part 55*b* in a substantially rectangular shape, a holding part 55*c* arranged above the body part 55*b* and holding a ridge-side edge of the solar panel 4 by fitting, a mounting part 55*d* having a T groove 55*a* as if to project from the body part 55*b* to the ridge side on the ridge side of the holding part 55*c*, and an opening 55*e* open to the outside flank of the mounting part 55*d* below the mounting part 55*d* and the insertion piece 52*c* of the fixing member 52 being insertable into. The supporting piece 5*c* of the eaves-side frame 5 is placed on the mounting part 55*d* by sandwiching the waterproof member 8 therebetween.

Thus, with installation structures of the examples in FIGS. 8 to 10, like an installation structure in the embodiment in FIG. 1, eaves-side frames can also easily be removed from outside by removing the bolt 9 or the nut 10, so that the same operation effect as described above can be achieved.

Figure 11:
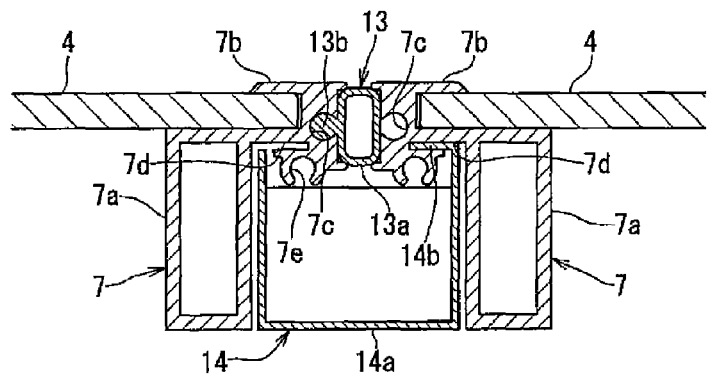
FIG. 11 is a sectional view showing an example of a lateral frame and an elastc member different from those shown in FIG. 1.
Figures 12A, 12B:
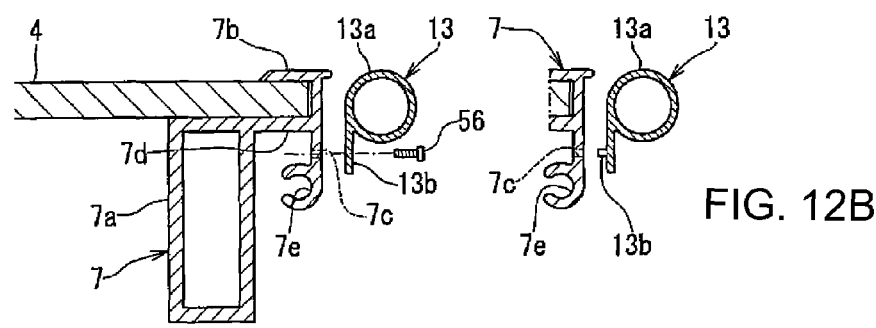
FIG. 12A is a sectional view showing an example of still another lateral frame and another elastic member.
FIG. 12B is a sectional view showing an example of still another lateral frame and another elastic member.

Further, in the above embodiments, the locking groove 7*c* of the lateral frame 7 is a groove substantially in a T shape and the locking part 13*b* of the elastic member 13 is a pair in an L shape, but for example, as shown in FIG. 11, the locking groove 7*c* of the lateral frame 7 may be cylindrical and the locking part 13*b* of the elastic member 13 may be cylindrical. Alternatively, as shown in FIG. 12A, the locking groove 7*c* of the lateral frame 7 may be made a through-hole and locking part 13*b* of the elastic member 13 shaped in a plate shape extending from the elastic part 13*a* so that the lateral frame 7 is caused to support the elastic member 13 by mounting a predetermined vis 56 into the locking groove 7*c* so as to sandwich the locking part 13*b*. Further, as shown in FIG. 12B, the locking groove 7*c* and the lockable locking part 13*b* may be formed in an extended portion extended in a plate shape from the elastic part 13*a* of the elastic member 13 so that the lateral frame 7 is caused to support the elastic member 13 by causing the locking groove 7*c* to lock the locking part 13*b*.

Figure 13A:
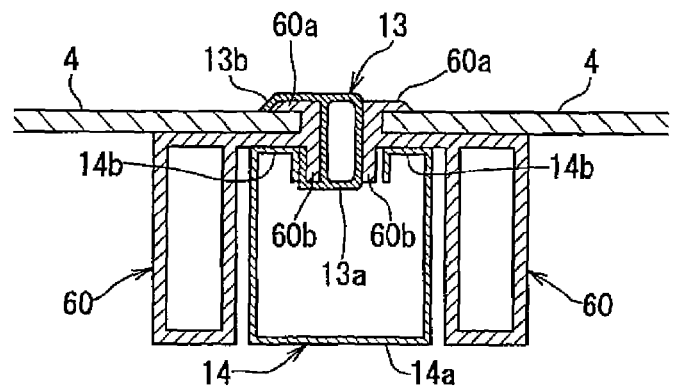
FIG. 13A is a sectional view showing an example of still another lateral frame and another elastic member.
Figure 13B:
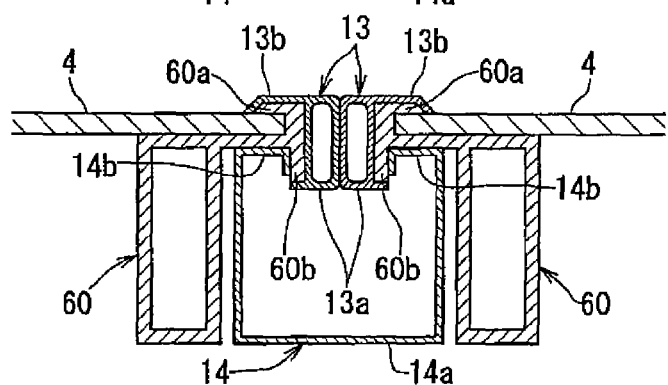
FIG. 13B is a sectional view showing an example of still another lateral frame and another elastic member.

Structures shown in FIGS. 13A to 13D and 14 may be adopted as joint structures of lateral frames. The same reference numerals are attached to similar components as those above and a detailed description thereof is omitted. First, in the example in FIG. 13A, a locked part 60*b* extending downward along the outside flank of a holding part 60*a* of a lateral frame 60 is formed therein and the locking part 13*b* of the elastic member 13 is formed into a shape to cover the holding part 60*a* and the locked part 60*b* of the lateral frame 60. The example in FIG. 13B is an example in which each of the lateral frames 60 opposite to the lateral frame 60 in FIG. 13A is caused to support the elastic member 13. The locking part 13*b* of the elastic member 13 in this example has, as illustrated, a shape in which the locking part 13*b* does not turn around to the rear side of the locked part 60*b*.

Figure 13C:
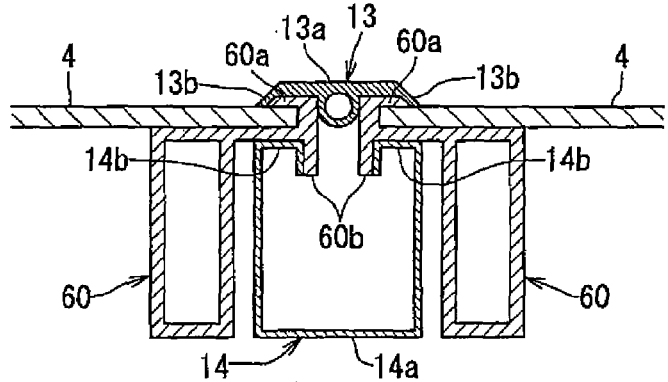
FIG. 13C is a sectional view showing an example of still another lateral frame and another elastic member.
Figure 13D:
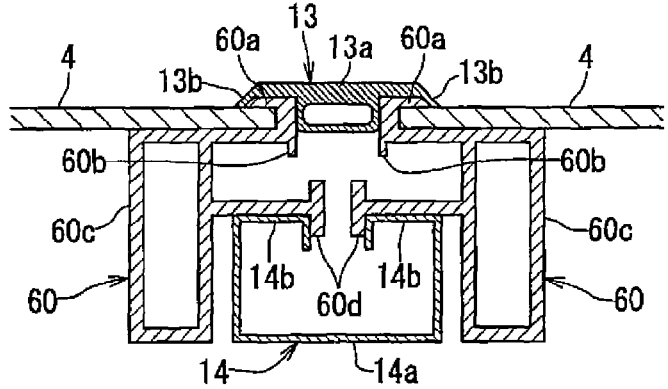
FIG. 13D is a sectional view showing an example of still another lateral frame and another elastic member.

Further, the example in FIG. 13C is an example in which the locking part 13*b* of the elastic member 13 has such a shape that covers the upper surface of the holding part 60*a* of each of the lateral frames 60 opposite to the lateral frame 60 in FIG. 13A. The example in FIG. 13D has the same configuration as FIG. 13C and further includes an extending piece 60*d* extending outward from the outside flank of a body part 60*c* of the lateral frame 60 and formed in a T shape. In the examples in FIGS. 13A to 13D, the gutter member 14 is held by the locked part 60*b* or the extending piece 60*d* of the opposite lateral frame 60 being sandwiched between the suspension pieces 14*b* of the gutter member 14.

Figure 14:
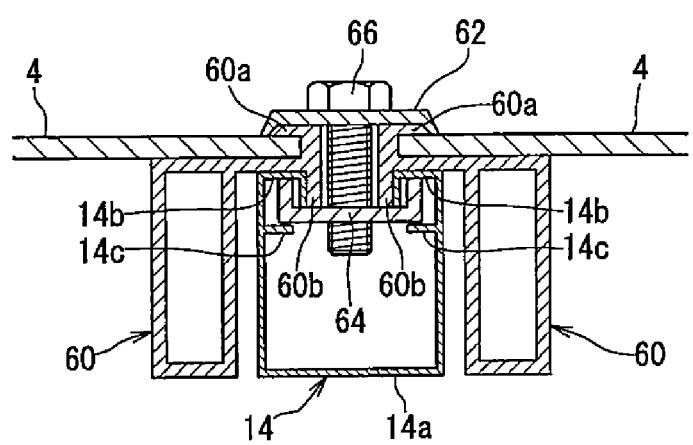

The example in FIG. 14 includes a top cap member 62 in a long shape arranged to cover the holding parts 60*a* of the opposite lateral frames 60 and a supporting metal fitting 64 in a substantially U sectional shape arranged to extend over the locked parts 60*b* of the opposite lateral frames 60. In this example, each of the lateral frames 60 can be fixed by screwing a bolt 66 to the supporting metal fitting 64 by cutting through the top cap member 62 from above the top cap member 62 to sandwich the lateral frames 60 between the top cap member 62 and the supporting metal fitting 64. Also in this example, the lateral frames 60 can firmly be linked by top cap member 62, the supporting metal fitting 64, and the bolt 66, thereby further increasing strength/rigidity of the unit. In this example, the gutter member 14 has a projecting piece 14*c* projecting below the supporting metal fitting 64 from the sidewall of the body part 14*a* formed therein, and the projecting piece 14*c* can prevent the supporting metal fitting 64 from falling to the gutter member 14.

Thus, the examples shown in FIGS. 13 A to 13D and 14 also can make a space between the lateral frames 60 sufficiently watertight and also the lateral frames 60 can easily be removed, so that the same operation effect as described above can be achieved. Each example described above may also be combined appropriately.

What is claimed is:

1. An installation structure of a solar cell module comprising:

a solar cell module including
 a solar panel whose outline is rectangular and flat in shape,
 an eaves-side frame in a long shape holding an edge on an eaves side of the solar panel,
 a ridge-side frame in a long shape holding an edge on a ridge side of the solar panel, the edge on the ridge side being opposite to the edge on the eaves side across the solar panel, and
 a pair of lateral frames in a long shape holding edges of the solar panel, the edges being different from the edges held by the eaves-side frame and the ridge-side frame; and a fixing member fixed to a predetermined structural member included in a roof at a position on a ridge side further than the ridge-side frame of the solar cell module, the fixing member configured to prevent the ridge-side frame from moving towards the ridge side of the roof and in a direction perpendicular to a surface of the solar panel, wherein when a second solar cell module, the solar cell module, and a third solar cell module are defined as being arranged from a ridge side to an eaves side in an order thereof, and when the fixing member and a second fixing member are defined as being arranged from a ridge side to an eaves side in an order thereof, an eaves-side frame of the second solar cell module is positioned above the ridge-side frame of the solar cell module prevented by the fixing member from moving, and is supported by the fixing member in such a fashion that the eaves-side frame of the second solar cell module can be fixed to the fixing member with a fastener by putting the eaves-side frame of the second solar cell module down on the fixing member, while the eaves-side frame of the solar cell module is positioned above a ridge-side frame of the third solar cell module and is prevented by the second fixing member from moving, and is supported by the second fixing member in such a fashion that the eaves-side frame of the solar cell module can be fixed to the second fixing member with a fastener by putting the eaves-side frame of the solar cell module down on the second fixing member, wherein each of the pair of lateral frames of each of the solar cell module, the second solar cell module, and the third solar cell module includes:

a locking groove in a predetermined cross-sectional shape, the locking groove being open to an outside flank and extending in a longitudinal direction; and a suspension groove formed on a solar panel side further than the locking groove and on a side below the solar panel, the suspension groove extending in a longitudinal direction, and being open to either one of a side of an outside flank or a side opposite thereto, wherein the installation structure of one solar cell module of the solar cell module, the second solar cell module, and the third solar cell module further comprises:

an elastic member in a long shape including a locking part configured to be locked by the locking groove of each of the pair of lateral frames, and an elastic part having the locking part on one flank; and a gutter member in a box shape whose eaves side and upper side are open and are longer than each of the pair of lateral frames locked by the elastic member, the gutter member including a suspension piece configured to be inserted into the suspension groove of at least one of the pair of lateral frames adjacent to an upper part of the gutter member, and wherein in a state where the locking part of the elastic member is locked by the locking groove of each of the pair of lateral frames, and where each of the pair of lateral frames of another solar cell module different from the solar cell module, the second solar cell module, and the third solar cell module abuts a flank of the elastic member opposite to the locking part such that an elastic force acts on the elastic member, the gutter member is supported by the pair of lateral frames with the suspension pieces of the gutter member inserted into the respective suspension grooves of the pair of lateral frames opposite to each other having the elastic member disposed therebetween.

2. The installation structure of a solar cell module according to claim 1, further comprising:

a water-resistant waterproof member in a long shape including an elastic member, the waterproof member arranged between the ridge-side frame of one solar cell module of the solar cell module, the second solar cell module, and the third solar cell module on the eaves side and the eaves-side frame of another solar cell module different from the solar cell module, the second solar cell module, and the third solar cell module on the ridge side, one of which is supported by one fixing member of the fixing member and the second fixing member and another of which is supported by another fixing member different from the fixing member and the second fixing member.

3. An installation structure of a solar cell module comprising:

a solar cell module including
a solar panel whose outline is rectangular and flat in shape,
an eaves-side frame in a long shape holding an edge on an eaves side of the solar panel,
a ridge-side frame in a long shape holding an edge on a ridge side of the solar panel, the edge on the ridge side being opposite to the edge on the eaves side across the solar panel, and
a pair of lateral frames in a long shape holding edges of the solar panel, the edges being different from the edges held by the eaves-side frame and the ridge-side frame; and a fixing member fixed to a predetermined structural member included in a roof at a position on a ridge side further than the ridge-side frame of the solar cell module, the fixing member configured to prevent the ridge-side frame from moving towards the ridge side of the roof and in a direction perpendicular to a surface of the solar panel, wherein when a second solar cell module, the solar cell module, and a third solar cell module are defined as being arranged from a ridge side to an eaves side in an order thereof, and when the fixing member and a second fixing member are defined as being arranged from a ridge side to an eaves side in an order thereof, an eaves-side frame of the second solar cell module is positioned above the ridge-side frame of the solar cell module prevented by the fixing member from moving, and is supported by the fixing member in such a fashion that the eaves-side frame of the second solar cell module can be fixed to the fixing member with a fastener by putting the eaves-side frame of the second solar cell module down on the fixing member, while the eaves-side frame of the solar cell module is positioned above a ridge-side frame of the third solar cell module and is prevented by the second fixing member from moving, and is supported by the second fixing member in such a fashion that the eaves-side frame of the solar cell module can be fixed to the second fixing member with a fastener by putting the eaves-side frame of the solar cell module down on the second fixing member, wherein the ridge-side frame of each of the solar cell module, the second solar cell module, and the third solar cell module includes an opening extending in a longitudinal direction on an outside flank, and wherein each of the fixing member and the second fixing member includes: a body part in a rectangular cross-sectional shape having an abutment surface abutting a flank of the ridge-side frame; an insertion piece projecting from a predetermined position of the abutment surface of the body part in a direction substantially perpendicular to the abutment surface, wherein the insertion piece is configured to be inserted into the opening of the ridge-side frame; and a fixing piece extending from a bottom surface of the body part in a direction opposite to a direction in which the insertion piece extends, the fixing piece configured to be fixed to a predetermined structural member.

4. An installation structure of a solar cell module, comprising:
- a solar cell module including
  - a solar panel whose outline is rectangular and flat in shape,
  - an eaves-side frame in a long shape holding an edge on an eaves side of the solar panel,
  - a ridge-side frame in a long shape holding an edge on a ridge side of the solar panel, the edge on the ridge side being opposite to the edge on the eaves side across the solar panel, and
  - a pair of lateral frames in a long shape holding edges of the solar panel, the edges being different from the edges held by the eaves-side frame and the ridge-side frame; and
- a fixing member fixed to a predetermined structural member included in a roof at a position on a ridge side further than the ridge-side frame of the solar cell module, the fixing member configured to prevent the ridge-side frame from moving towards the ridge side of the roof and in a direction perpendicular to a surface of the solar panel,
- an eaves-side frame of another solar cell module being positioned above the ridge-side frame of the solar cell module prevented by the fixing member from moving, and being supported by the fixing member from outside, wherein the eaves-side frame of the solar cell module includes a supporting piece extending outward from a bottom edge of an outside flank in substantially the same direction as a direction in which the solar panel extends, the supporting piece having a plurality of through holes passing therethrough at predetermined positions in a longitudinal direction, and wherein the fixing member includes a T groove in an inverted T cross-sectional shape arranged on a ridge side further than the ridge-side frame, the T groove extending in a longitudinal direction, and being open on an upper side, and wherein the installation structure of a solar cell module further comprises:

a fastener including
- a bolt having a cylindrical male screw in a cylindrical shape configured to pass through an open portion of the T groove, and a head formed at one end of the male screw configured to slide inside the T groove and configured not to rotate; and
- a nut configured to be screwed to the male screw of the bolt, and wherein in a state where the head of the bolt is inserted into the T groove so that the male screw of the bolt in the fastener projects outward from the open portion of the T groove and the male screw projecting upward from the fixing member is caused to pass through each of the plurality of through-holes of the supporting piece in the eaves-side frame, the eaves-side frame is supported by the fixing member by the nut screwed to the male screw.

\* \* \* \* \*